US012806817B2

(12) United States Patent
Toikkanen

(10) Patent No.: US 12,806,817 B2
(45) Date of Patent: Nov. 24, 2026

(54) METHOD FOR PROCESSING OF TREES USING MACHINE VISION WITH SOFTWARE MEANS, A SYSTEM AND A WOOD PROCESSING LINE

(71) Applicant: KIVIPESKI OY, Konnevesi (FI)

(72) Inventor: Jouko Toikkanen, Konnevesi (FI)

(73) Assignee: KIVIPESKI OY, Konnevesi (FI)

( * ) Notice: Subject to any disclaimer, the term of this patent is extended or adjusted under 35 U.S.C. 154(b) by 111 days.

(21) Appl. No.: 19/111,445

(22) PCT Filed: Jun. 27, 2023

(86) PCT No.: PCT/FI2023/050397
§ 371 (c)(1),
(2) Date: Mar. 13, 2025

(87) PCT Pub. No.: WO2024/056936
PCT Pub. Date: Mar. 21, 2024

(65) Prior Publication Data

US 2026/0084339 A1 Mar. 26, 2026

(30) Foreign Application Priority Data

Sep. 13, 2022 (FI) ...................................... 20225791

(51) Int. Cl.
*B27L 1/04* (2006.01)
*G06V 10/147* (2022.01)
(Continued)

(52) U.S. Cl.
CPC .............. *B27L 1/04* (2013.01); *G06V 10/147* (2022.01); *G06V 10/774* (2022.01); *G06V 10/82* (2022.01); *G06V 20/52* (2022.01); *G06V 2201/06* (2022.01)

(58) Field of Classification Search
CPC .............. B23Q 17/249; B23Q 17/2414; B23Q 17/2409; B23Q 17/24; B27L 1/00; B27L 1/05; B27L 1/045; B27L 1/04
See application file for complete search history.

(56) References Cited

U.S. PATENT DOCUMENTS 5,274,244 A 12/1993 Johansson et al.
10,775,160 B2 9/2020 Wolff et al.
(Continued)

FOREIGN PATENT DOCUMENTS

EP 0985501 A2 3/2000
EP 1273404 A1 1/2003
(Continued)

OTHER PUBLICATIONS

European Patent Office, International Preliminary Report on Patentability, Application No. PCT/FI2023/050397, Mailed Jun. 11, 2024, 27 pages.

(Continued)

*Primary Examiner* — Matthew J Daniels
(74) *Attorney, Agent, or Firm* — Ziegler IP Law Group, LLC.

(57) ABSTRACT

Processing trees using machine vision with a software, wherein trees are debarked with a debarking drum (12),
harmful objects smaller than a selected dimension are removed,
debarked trees are routed from the debarking drum over a trap,
trees on a conveyor are illuminated,
trees are recorded on the conveyor using at least one camera,
a harmful object is automatically detected utilising machine vision by recognising hue information or gradients as elements from the image, registering the (Continued)

elements to the field of view, determining element distances in the field of view thus creating three-dimensional information, recognising patterns with the help of registered elements and three-dimensional information, and recognizing stones or plastic as harmful objects, with a criterion preselected with the help of patterns, the conveyor is automatically stopped, the harmful object is removed, trees are moved using the conveyor.

15 Claims, 12 Drawing Sheets

(51) Int. Cl.

| | |
|---|---|
| ***G06V 10/774*** | (2022.01) |
| ***G06V 10/82*** | (2022.01) |
| ***G06V 20/52*** | (2022.01) |

(56) References Cited

U.S. PATENT DOCUMENTS

| | | | |
|---|---|---|---|
| 2004/0246473 | A1 | 12/2004 | Hermary et al. |
| 2013/0333805 | A1 | 12/2013 | Gagnon et al. |

FOREIGN PATENT DOCUMENTS

| | | | | | |
|---|---|---|---|---|---|
| EP | 4190521 | A1 | | 6/2023 | |
| FI | 113496 | B | * | 4/2004 | ........... G01N 23/083 |
| SE | 1551353 | A1 | | 4/2017 | |
| SE | 1650407 | A1 | | 9/2017 | |
| WO | 2006027802 | A1 | | 3/2006 | |
| WO | 2008000910 | A1 | | 1/2008 | |
| WO | 2015056123 | A2 | | 4/2015 | |

OTHER PUBLICATIONS

Finnish Patent and Registration Office, Search Report, U.S. Appl. No. 20/235,946, Mailed Nov. 7, 2024, 2 pages.

European Patent Office, International Search Report, Application No. PCT/FI2023/050397, Mailed Nov. 17, 2023, 2 pages.

* cited by examiner

METHOD FOR PROCESSING OF TREES USING MACHINE VISION WITH SOFTWARE MEANS, A SYSTEM AND A WOOD PROCESSING LINE

FIELD

The aspects of the disclosed embodiments is related to a method for processing of trees using machine vision with software means, wherein A method for processing of trees using machine vision with software means, wherein trees are debarked with a debarker, trees on a conveyor are illuminated with a lighting device, trees are recorded on the conveyor after the debarking drum using at least one camera as detection means for creating images, a harmful object on the conveyor among trees is automatically detected from the images utilising machine vision in the following steps of:

recognising hue information or gradients as elements from the image, registering the elements to the field of view, determining element distances in the field of view thus creating three-dimensional information pertaining to the field of view, recognising patterns with the help of registered elements and three-dimensional information, recognising harmful objects with a criterion preselected with the help of patterns, and debarked trees are moved forward using the conveyor.

The aspects of the disclosed embodiments is also related to a system and a wood processing line.

BACKGROUND

Trees used in pulp manufacture must be debarked and chipped before using them in pulp cooking. Together with felled trees coming from the forest to a wood processing line, extraordinary material also often arrives, which, for example, has frozen to trees in winter or has come to a load of trees with the crane grapple when loading it. Extraordinary material must be removed from among trees before the trees end up in the chipper, the blades of which are damaged by extraordinary material, particularly by stones, plastic or metal parts. In a wood processing line, trees pass through a debarking drum, wherein loose harmful objects smaller than the limit size, such as stones, plastic and bark, drop out from the bark openings of the debarking drum while the trees drop down from the curved piece of the debarking drum. Thus, among the trees removed from the debarking drum, there should only exist harmful objects, such as stones and plastic, which are bigger than the limit size. For removing these objects, the wood processing line comprises a trap after the debarking drum. For example, the trap is a structure between two successive conveyors including an opening filled with water and spiked rollers for moving trees on both sides of the opening. In water traps, water is continuously fed to the trap opening thereby providing an overflow from the trap to the chutes surrounding the conveyors. Water overflowing from the trap opening keeps the tree ends sufficiently high so that the trees travel higher than the trap opening and do not bump against the walls of the trap opening. Being more dense than water, harmful objects, such as stones and plastic, sink to the bottom of the trap, from where they can be removed. Alternatively, in the case that water is not used in the trap but, for example, gratings with openings or slots, over which trees move, extraordinary objects drop to the trap through the openings or the slots.

A problem with the wood processing line described above is that in some cases trees can be removed from the debarking drum in bundles, onto which stones or plastic may fall. Thus, a harmful object does not drop to the trap but floats on the raft formed by the trees or can pass by the trap in some other way on a wood processing line. In this case, an extraordinary harmful object may end up directly in the chipper, unless the operator accidentally detects the harmful object while monitoring the wood processing line. On the other hand, for example, plastic may pass through the chipper as a harmful object and cause quality deviations in the end product.

Publication SE 1551353 A1 known as prior art proposes a prior art wood processing line, wherein a trap is used after the debarking drum for removing harmful objects. In addition, a metal detector or digital image processing can be used after the trap for detecting harmful objects. However, a problem with the use of a metal detector is that it does not detect stones or plastic. A problem may also exist with alloy metals. Regarding the implementation of digital image processing, only the idea is presented but not a feasible implementation.

SUMMARY

The aspects of the disclosed embodiments provide a method for processing of trees, with which harmful objects on a conveyor are automatically detected thereby preventing further access of a harmful object from the conveyor to further processing, such as a chipper.

The aspects of the disclosed embodiments are characterized by a method for processing trees using machine vision with software means, wherein trees are barked with a debarking drum, harmful objects smaller than a selected dimension are removed from among trees in the debarking drum through bark openings included in the debarking drum, debarked trees are routed from the debarking drum over a trap for removing harmful objects bigger than a selected dimension from among the trees, and debarked trees are moved further using a conveyor. In addition, trees on the conveyor are illuminated with a lighting device using indirect lighting on a section of the conveyor covered with ambient light covers, trees are recorded on the conveyor after the debarking drum using at least one camera as detection means for creating images, and a harmful object on the conveyor among trees is automatically detected from the images with machine vision in successive steps, in which hues or gradients are recognised as image elements, which are registered to the field of view. Furthermore, in the method, element distances are determined for forming three-dimensional information pertaining to the field of view, and harmful objects, namely stones or plastic, are recognised with a preselected criterion with the help of patterns and three-dimensional information, wherein harmful object recognition utilises said patterns. In addition, the conveyor is automatically stopped when detecting a harmful object on the conveyor, a harmful object on the conveyor is removed from among trees, and debarked trees are moved further using the conveyor.

With a method according to the aspects of the disclosed embodiments, it can be ensured that even harmful objects that have passed by the trap can be automatically detected and removed before they advance any further in the process, to a chipper, for example, where they cause major damage.

Due to automated harmful object recognition based on a camera, distance measurement means and software means, the operator does not need to visually monitor trees moving on the conveyor on a continuous basis for detecting harmful objects. In such a method, the use of a trap ensures that harmful objects cannot advance any further in the process under the trees as harmful objects drop to the trap, whereas harmful objects that have passed by the trap on top of the trees are recognised with detection means and software means. As harmful objects, stones and plastic are particularly problematic, since as non-magnetic objects, they can also pass through a metal detector that is preferably used in the context of conveyors. Some alloy metals can also pass through a metal detector without an alarm, but will be detected with the method according to the aspects of the disclosed embodiments.

Although the steps performed in harmful object recognition with software means are described above in a certain order, the order of the steps can also be different.

In the method according to the aspects of the disclosed embodiments, illumination of the trees and the conveyor for recording is essential for the detection performed with software means. Illumination cannot be direct lighting, because trees are wet when arriving to the conveyor and will also wet the conveyor. Direct lighting would create remarkable reflections, which would overexpose the recording causing error to the process. For this reason, it is important to use indirect lighting together with ambient light covers to achieve uniform and effective lighting for the recording. In addition, trees are randomly located on the conveyor, sometimes on top of each other in multiple layers, for which reason it is important to also try to minimise shadows falling on the conveyor as well as intense direct reflections using indirect lighting.

Three-dimensional information pertaining to the field of view may be a point cloud, a disparity image or a triangle net model or other equivalent representation method for three-dimensional information.

Advantageously, the following steps are performed in the method with machine vision before image processing, wherein a conventional image and three-dimensional information pertaining to the image are created from the images recorded, the conventional image and three-dimensional information are merged into a 3d image and the 3d image is entered to a machine vision unit for detecting a harmful object from the 3d image.

Advantageously, indirect lighting is reflected from an ambient light cover to the object recorded, the surface of the ambient light cover being matt surfaced for preventing direct reflections and dispersing light.

The harmful object is preferably a stone or plastic, most preferably a stone. Although plastic may create a quality deviation in further processes, it can be caught in other process steps prior to the end product before it causes damage. Instead, when getting to the chipper, a stone may cause destruction of blades and thereby an expensive production break.

Advantageously, trees are routed away from the debarking drum irregularly and randomly. In other words, trees are not placed separately at a distance from each other, which would facilitate detection of stones, however, creating a huge amount of additional work.

The preselected criterion may be one or more of the following: hue, intensity of colours, pattern shape, pattern size, pattern distance. These are sufficiently simple criteria so that software means can make reliable recognitions of harmful objects very fast.

A colour camera is preferably used as the camera. With a colour camera, more information about hues can be collected from the conveyor than in black and white recording, which enables, for example, separating branches and tree ends from harmful objects for improving the accuracy of the method.

Hues of images can be recognised by software means by determining the 8-bit R, G, B and A values of each pixel of each image taken.

Advantageously, in the method, individual pixels of images are stored in a three-dimensional coordinate system as a three-dimensional point cloud.

According to a first embodiment of recording and distance determination, two cameras equipped with one lens or one stereoscopic camera equipped with two lenses are used as detection means, in which case distance determination means consist of software means, which are arranged to determine both hues and distances from the images. Thus, both hues and distances can be recognised with software means using a neural network, for example, in which case other different distance measurement means are not needed. From a pair of images of stereoscopic recording, an elevation image can be created showing the dimensions of objects that exist in the image.

Advantageously, based on triangulation, the location of hues of each image taken with each camera is determined in the 3-dimensional space and this location is stored in the set of point clouds together with the hue of the pixel concerned.

Advantageously, triangulation utilises the known location information of cameras as well as orientation of cameras when comparing with each other images taken simultaneously with both cameras for determining the location of individual points.

According to a second embodiment of recording and distance determination, as distance measurement means, a laser light is used for sending a laser line towards the conveyor and a camera is used for measuring visible light reflected by the harmful object thereby recognising the harmful object based on the length of the laser line measured with the software means from the images based on laser triangulation. This is an alternative method for implementing distance measurement means.

The laser line can be measured by recording the image comprising the laser line with a camera; the Y coordinate of the point comprising the laser line in the image represents the distance of this point from the camera, the X coordinate represents the location of this point in the lateral direction, while the third dimension can be defined in a function of the time of recording and the movement of the object.

Advantageously, a neural pattern network, preferably a deep learning neural network, is used for harmful object recognition, wherein input information uses two channels, one of the channels consisting of said three-dimensional information and the other channel representing recognised hue information pertaining to the image. Advantageously, the neural network has been trained using a database of images taken with the same system and in which harmful objects appear, and objects, the hue and shape of which would correspond to harmful objects trained to it, are sought with the neural network from the three-dimensional point clouds. With a neural network, it is possible to simplify computation by utilising a feature of the neural network to compress data to an easily computable form, which enables practically real-time detection. In other words, the neural network utilises a statistical method in computation. Instead of a Deep Learning neural network, the neural network can also be some other neural network, such as a supervised or a reinforcement learning neural network.

In the method, it is possible to verify the presence of a harmful object by defining a percentage of certainty to the object; when this exceeds the limit value, preferably 50%, the object is interpreted as a harmful object and the recognition data of a harmful object provided by the DL neural network is compared to limit values using software means, this recognition data including at least hue information included in the image and elevation data, which is compared to the elevation data of known tree ends for verifying the presence of a harmful object.

Advantageously, when using a neural network, before recording the trees, the following steps are performed in which harmful objects are manually recognised from training images, the edges of a harmful object are marked in the training images, and said neural network is told to learn training images, based on which the neural network recognises harmful images. Based on trained images, the neural network utilises its own computational logic for detecting corresponding harmful objects from the images taken by the detection means.

Advantageously, for database images in which a harmful object has been actually detected, hues and the location of the harmful object has been determined in the 3-dimensional point cloud.

According to a second embodiment of harmful object recognition, to recognise harmful objects, a three-dimensional point cloud is processed using pattern recognition by searching three-dimensional point clouds for objects, the hue and shape of which would correspond to harmful objects defined in the pattern recognition software. The method based on pattern recognition is a deterministic method for detecting a harmful object.

According to a third embodiment of harmful object recognition, pattern recognition is used as an addition to a DL neural network. Thus, in more unreliable detections of the DL neural network, for example, pattern recognition can be used as an addition to reinforce stone recognition in order to avoid unnecessary stops.

Advantageously, when an object corresponding to a harmful object is found, the observation of the field of view is limited to the defined coordinates of the field of view of the harmful object.

Advantageously, in the method, hue differences and distances are looked for in the images, recognised differences and distances are compared to the hue differences and distances of the harmful objects trained in the memory, and a decision on the detection is made based on the comparison.

Advantageously, harmful object recognition with detection means provides an alarm and a conveyor stop, based on which an image of the harmful object found on the conveyor is shown to the operator of the wood processing line. If the object turns out to be a false positive detection, the operator can acknowledge the alarm and restart the conveyor without a need to physically walk to the conveyor to check the situation.

According to an embodiment, in the method, trees are also recorded with a separate colour camera on the conveyor after the debarking drum, colour images of the colour camera are stored and the neural network is trained by comparing the colour images with the images taken at the same moment by the detection means. With the colour camera, the reliability of the system can be improved, when the neural network is told to learn situations in which a detection of a harmful object or a lack of it in the images taken by the detection means has been found erroneous.

Advantageously, when using a colour camera, colour images deviating by ±20%, preferably ±10%, from the limit value of the percentage of certainty are stored, colour images are compared to the images taken by the detection means that exceed the limit value of the percentage of certainty but where a harmful object has not been found among the trees during conveyor stops performed based on them, or to images taken by the detection means that are below the limit value of the percentage of certainty but based on which the harmful object has advanced in the process among the trees. By training the neural network only in so-called borderline cases, in which the percentage of certainty is close to the detection, the accuracy of the system can be increased in situations where the presence of a harmful object in images is challenging.

Advantageously, the colour camera is located essentially in the same place on the conveyor as the detection means in the longitudinal direction of the conveyor, centrally relative to the conveyor and so that it records in the lagging direction relative to the conveyor, i.e., at an angle of between 30° and 60°, preferably between 40° and 50°, relative to the travel direction of the conveyor. In this way, a colour image of the harmful object can be recorded with the camera after the harmful object recognised by the detection means, before the harmful object exits the field of view of the colour camera.

In the method, images in which the harmful object appears are advantageously presented to operators after the conveyor stop before the object is removed from the conveyor for a manual assessment by the operators. In this way, the recognition can be augmented with a human assessment of the need of removing the harmful object and, if the stop is due to a false positive detection, the operator can restart the conveyor without a need to physically walk to the conveyor for checking the situation.

In the method, a separate decomposition system for bark piles composed of bark that has detached from trees is advantageously used, bark piles are decomposed with a pressurised water jet system by spraying water at a pressure of 80 to 300 bar to the bark piles for decomposing them for exposing harmful objects possibly existing in the bark piles. By decomposing the bark piles, it is possible to ensure that harmful objects cannot be conveyed inside or on top of the bark piles up to the chipper, but harmful objects are separated from the bark and either drop to a trap or are detected with machine vision. The purpose of the decomposition system for bark piles is to even out the flow of trees coming from the debarking drum so that forming bark piles do not collect trees to large bundles under which harmful objects easily become hidden. With a decomposition system, the advance of trees further from the debarking drum is more uniform; thus, harmful objects are more easily visible and drop already to the trap or are caught at the latest with the automated camera monitoring.

Advantageously, in the decomposition system, bark piles travelling on an intermediate conveyor before the trap are recorded with an additional camera in the context of the intermediate conveyor immediately following the debarking drum, and bark piles are recognised from the images taken by the additional camera using machine vision of second software. Thus, the decomposition system can also be automatic and function only when bark piles are detected.

Alternatively, a water jet can be continuously on and it can be is favourable regarding accumulation of bark piles between the debarking drum and the gate.

Another aspect of the disclosed embodiments is to provide a system, with which harmful objects can be automatically detected on a conveyor for transferring trees and remove them before they advance any further.

The aspects of the disclosed embodiments are characterized by a system for detecting stones among trees, where the system includes an ambient light cover for covering the conveyor at least partly and at least one lighting device arranged to illuminate the trees on the conveyor indirectly via the ambient light cover. The system also includes detection means comprising at least one camera for recording trees and creating images, arranged in the context of a conveyor, which is located after the debarking drum and traps included in the context thereof, and a computing unit comprising a memory and software means for automatically recognising harmful objects from images based on machine vision and for stopping the conveyor when a harmful object is detected on the conveyor. Software means are arranged to recognise hues or gradients as elements from the images, register the elements to the field of view and determine the element distances in the field of view thus forming three-dimensional information pertaining to the field of view. In addition, software means are arranged to recognise patterns with the help of registered elements and three-dimensional information and recognise harmful objects, preferably stones or plastic, with a preselected criterion with the help of patterns.

With a lighting device and a camera, the system is easy to implement, since there are multiple component suppliers for lighting devices and cameras, and the system can use existing commercially available lighting devices and cameras. In this context, visible light means a wave motion in the wavelength range between 400 and 780 nm. The lighting device uses an essentially indirect illumination, which prevents generation of reflections.

Advantageously, the ambient light cover includes a lid and lateral protections for covering the conveyor from light emitted by the lighting devices of the production plant. With a separate lid, it is possible to prevent the penetration of light emitted by conventional lighting devices of the production plant to the conveyor, where it can cause disturbances to cameras, for example, when light is reflected to the camera from the surface of the conveyor or trees. Naturally, the ambient light cover is open at both ends enabling the travel of the conveyor through the ambient light cover. An ambient light cover is only obligatory in the area of the lighting device and the camera; for the rest, the conveyor can be uncovered. Light emitted by lighting devices aimed at the ambient light cover is reflected from the lid and preferably also from the lateral protections towards trees.

Two or more lighting devices are preferably provided for minimising shadows.

The camera is advantageously a colour camera.

The system may additionally include a camera housing for the camera arranged with an overpressure for keeping the camera clean. In other words, air supplied into the camera housing is discharged from the camera lens aperture outwards from the camera housing, the outward air flow thus preventing any splashes or dirt from getting in contact with the camera lens and thereby also preventing soiling of the camera.

According to the first advantageous embodiment of recording and distance determination, detection means consist of two cameras equipped with one lens or one camera equipped with two lenses for detecting a harmful object, and software means are arranged to recognise hues from the images and function as distance determination means for determining distances from the images. Thus, the recognition of hues and distances by software means can advantageously take place using the same neural network or, alternatively, in two separate neural networks.

According to the second alternative embodiment of recording and distance determination, the distance measurement means consist of a laser light for sending a laser line towards the conveyor, and software means are arranged to measure visible light reflected by trees and recognise a harmful object according to the measured length of the laser line based on laser triangulation. When using a laser light, external light does not disturb the detection of a harmful object, since a laser light creates a very intense reflection from the surface of the harmful object.

The laser light can be arranged to illuminate the conveyor from a different angle than is arranged for recording the conveyor with the camera. In this case, the laser line formed on top of the trees and any harmful objects on the conveyor has a variable distance from the surface of the conveyor, which can be measured with the camera for recognising a harmful object.

A system according to the aspects of the disclosed embodiments can be used after a debarking drum for finding harmful objects among debarked or non-debarked trees, but also in energy wood chipping before the chipper, for instance.

According to preferably the first embodiment of harmful object recognition, software means include a Deep Learning neural network for harmful object recognition. The neural network functions as artificial intelligence searching for harmful objects.

According to an embodiment, the system includes a separate colour camera for recording trees on the conveyor after the debarking drum, and software means are arranged to store the colour images of the colour camera and train the neural network by comparing the colour images to the images taken at the same moment by the detection means. With the colour camera, the reliability of the system can be improved, when the neural network is told to learn situations in which a suspected detection of a harmful object or a lack of it in the images taken by the detection means has been found erroneous.

Advantageously, when using a colour camera, software means are arranged to store colour images that deviate by ±20%, preferably ±10%, from the limit value of the percentage of certainty, and compare the colour images to the images taken by the detection means which exceed the limit value of the percentage of certainty but where a harmful object has not been found among the trees during a conveyor stop performed based on them, or to images taken by the detection means which are below the limit value of the percentage of certainty but based on which the harmful object has advanced in the process among the trees, for training the neural network. By training the neural network only in so-called borderline cases, in which the percentage of certainty is close to the detection, the accuracy of the system can be improved in situations where the presence of the harmful object in images is challenging.

Advantageously, the system includes a separate decomposition system for bark piles, which comprises a pressurised water jet system for spraying water to an intermediate conveyor for decomposing bark piles for exposing any harmful objects existing in the bark piles, while second software controls the water jet system based on images taken by an additional camera. With such a decomposition system, harmful objects hidden in the bark piles can be separated from the bark, whereupon they either end up in traps or are detected by machine vision.

The decomposition system may additionally include an additional camera arranged in the context of an intermediate conveyor immediately following the debarking drum before the trap for recording bark piles travelling on the intermediate conveyor, and second software for recognising bark piles from the images taken by the additional camera using machine vision. With the use of an additional camera and second software, the operation of the pressurised water jet system can be concentrated only to times when it is detected that bark piles start to emerge. In other words, in this case the water jet need not be continuous, which brings savings to pumping costs.

Another object of the aspects of the disclosed embodiments is to provide a wood processing line, wherein advance of harmful objects is reliably prevented.

The aspects of the disclosed embodiments are characterized by a wood processing line, which includes a debarking drum for debarking trees, the debarking drum including bark openings with a size according to a selected dimension for removing objects smaller than the selected dimension from among the trees, a conveyor for moving debarked trees further, and a water-filled trap located after the debarking drum in the travel direction of the trees for removing loose harmful objects that exist among debarked trees and are bigger than the selected dimension from among the trees. In addition, the wood processing line includes a system according to any of the aforementioned embodiments of the aspects of the disclosed embodiments.

Advantageously, the wood processing line additionally includes a chipper arranged after the conveyor for chipping trees to woodchips. The recognition and removal of harmful objects before they end up in the chipper is particularly important when using a chipper, since a harmful object destroys the chipper blades and causes an expensive shutdown during the use of the chipper.

According to an embodiment, the wood processing line includes feed equipment located before the debarking drum arranged to feed tree to the debarking drum, the feed equipment being arranged at an angle of between 5° and 35° relative to the axis of rotation of the debarking drum for feeding trees to the debarking drum at a gentle angle. In this way, trees that are simultaneously fed to the debarking drum do not bump against the debarking drum as intensely as when feeding takes place at a steep angle. This, in turn, reduces the tendency of trees to stick to each other as a consequence of the collision thus forming a "lump", in which case harmful objects are also more easily conveyed further in the wood processing line along with trees that have stuck to each other.

The width of the conveyor on the wood processing line for a system according to the aspects of the disclosed embodiments may range between 1.0 and 1.8 m. Thus, a sufficient amount of trees can fit in the transfer conveyor.

The transfer speed of the conveyor on the wood processing line may range between 1.0 and 2.0 m/s, preferably between 1.1 and 1.5 m/s.

A method and a system according to the aspects of the disclosed embodiments can also be utilised in such wood processing lines where tree is forwarded from the trap by gravity using a feed channel or chute. In this case, trees and a harmful object among them can be stopped on a conveyor located before the chipper. Advantageously, such an embodiment also requires after the trap at least one conveyor, which is driven in a controlled way by an external force and can be stopped so that a metal detector can be placed in the context thereof. In other words, in this context, the conveyor is to be understood more extensively to also comprise separate gravity feed channels or equivalent. However, it is most advantageous to implement the aspects of the disclosed embodiments in the context of a motorised conveyor, because in this case the stopping of trees on the conveyor is performed in a simple way by merely stopping the motor.

For example, the conveyor can be a belt conveyor or a roller conveyor, but it can also be a slat conveyor or equivalent.

The aspects of the disclosed embodiments offers a solution to a problem, the economical significance of which has not been recognised earlier, since the industry has generally trusted that existing systems, i.e., debarking drum openings, stone traps and metal detectors are sufficient actions for protecting further processes from harmful objects. This aspects of the disclosed embodiments presents a mechanism with which harmful objects can penetrate an existing multistage system for removing harmful objects and thus recognises a new and significant existing problem in the industry. It is also surprising that software means can be used to recognise a harmful object among trees with varying sizes and appearances located randomly on a conveyor during the movement of the line. This is a remarkably difficult situation regarding machine vision, since the background on which the harmful object must be recognised, is particularly variable.

BRIEF DESCRIPTION OF THE DRAWINGS

The aspects of the disclosed embodiments is described below in detail with reference to the accompanying drawings that illustrate some of the embodiments of the aspects of the disclosed embodiments, in which.

BRIEF DESCRIPTION OF THE DISCLOSED EMBODIMENTS

Figure 1:
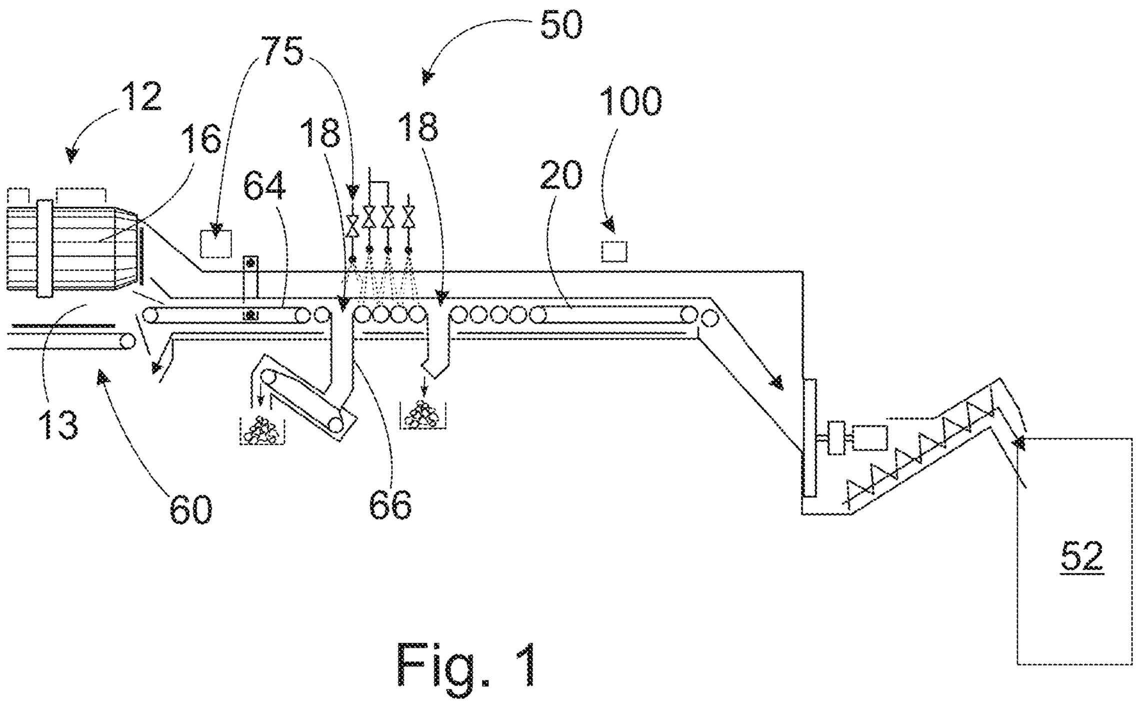
FIG. 1 is a lateral basic view of a wood processing line according to the aspects of the disclosed embodiments.

FIG. 1 is a basic view illustrating a wood processing line according to the aspects of the disclosed embodiments having a system 100 according to the aspects of the disclosed embodiments located therein, the system being used with a method according to the aspects of the disclosed embodiments. As the first part, the wood processing line 50 includes a debarking drum 12 for removing the bark of trees. The debarking drum can be a prior art debarking drum 12, which includes bark openings 16 for removing harmful objects 13, such as bark or small stones smaller than a selected dimension from among trees existing in the debarking drum. The description related to the figures of this application, discusses an embodiment of the aspects of the disclosed embodiments for removing stones, but it is to be understood that an extraordinary object that is to be removed can just as well be a piece of plastic. The debarking drum rotates around its longitudinal axis, whereupon trees inside it rise in the inner periphery of the debarking drum until they drop down. Impacts due to collisions of trees against other trees or the inner surface of the debarking drum detach bark from trees. The bark is also removed through the bark openings 16. Trees are preferably meant for so-called pulpwood, which are chipped after debarking. The selected dimension is preferably from 4 to 7 cm; therefore, pieces with a smaller diameter can drop from the debarking drum 12 through the bark openings 16 in the same way as the bark detached from the tree.

Under the debarking drum, there is preferably a separate collection system 60, with which bark is recovered and any stones are separated from it before further processing of the bark by combustion, for example. The wood processing line is preferably a wood processing line 50 that precedes a pulp digester and the purpose of which is to debark and chip wood with a chipper 52 to woodchips of a suitable size, which can be cooked for separating the different ingredients of wood during pulp manufacture.

From the debarking drum 12, trees can move forward along a separate feed chute or preferably an intermediate conveyor 64 until they arrive at a trap 18. At this stage, stones may still exist among the trees, primarily with a size bigger than the dimensions of the bark openings 16 of the debarking drum 12. The trap 18 is preferably a stone trap, which is water-filled. The purpose of the trap is to collect stones that still exist among the trees from among the trees. The dimension of the trap in the travel direction of the trees is preferably shorter than the tree length, preferably smaller than a half of the length of trees to be moved. For example, the length of the trap can range between 0.4 and 0.8 m, if the tree length is from 2.5 to 3.0 m. The tree length can also be notably bigger, from 2.5 to 7.0 m. The trap 18 preferably includes a water-filled well 66, which is continuously supplied with water in such a way that the water level of the well 66 is equal to the level of the conveyor preceding or following the trap 18. The water cushion of the well 66 is overflowing, i.e., water flows over the edges of the well 66 and overflowing water is recovered with chutes surrounding the conveyors 64, 20 and the trap 18 (not shown in the figures). Thus, trees float on the surface of the water cushion over the well 66 of the trap 18 and continue to travel transported by the subsequent conveyor 20. Instead, stones that are heavier than wood sink through the water cushion down to the bottom of the well 66. The trap can be emptied during maintenance shutdowns discharging water present in the well for removing stones.

Advantageously, two successive traps 18 according to FIG. 1 may be provided, by which it is aimed to ensure, for example, that a stone that has travelled past the first trap 18 on top of the trees drops to the trap 18 probably at the second trap 18. In spite of this, stones that have, for example, frozen or become otherwise stuck to the surface of trees, can pass by the traps 18. According to prior art, removing such stones has been completely random and has only been based on a detection by the operator during process monitoring. According to the aspects of the disclosed embodiments, located after the trap 18, there is a system 100 according to the aspects of the disclosed embodiments, with which stones are detected and recognised among trees as late as in this step of the wood processing line. The wood processing line can also be fitted with a metal detector arranged after the trap, but this detects only magnetic metals and not necessarily alloy metals.

Figure 2A:
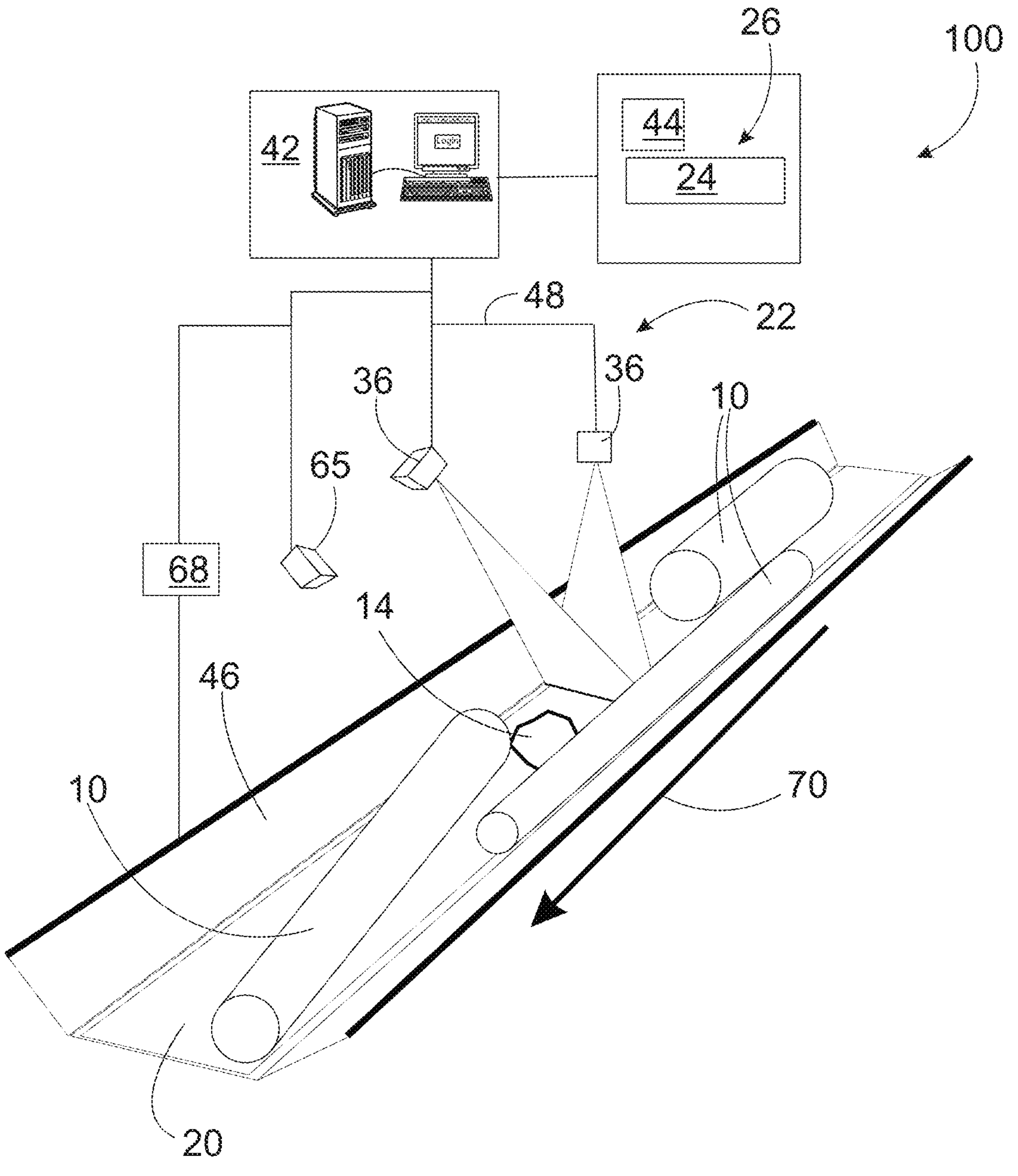
FIG. 2*a* is an axonometric basic view of a first embodiment of a system according to the aspects of the disclosed embodiments.
Figure 2B:
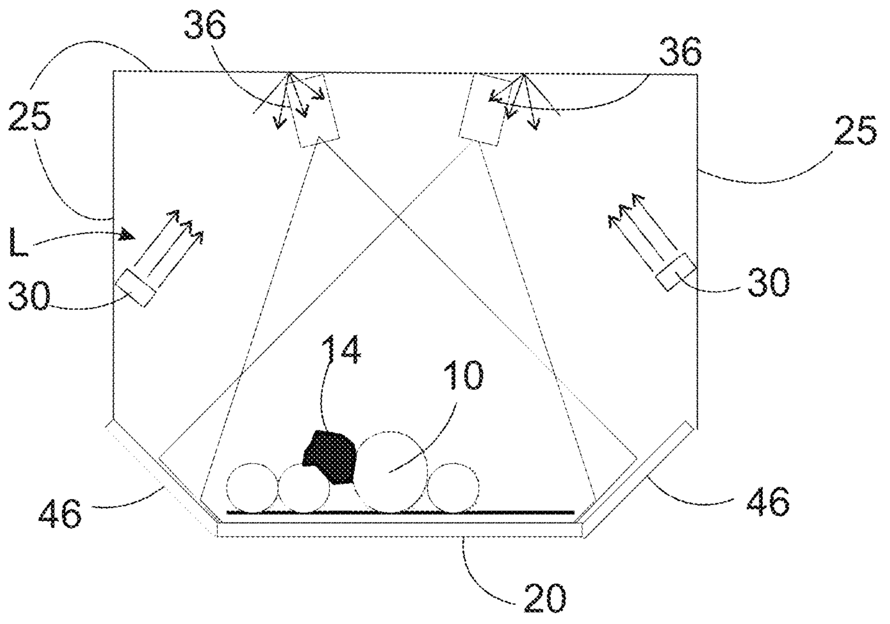
FIG. 2*b* is a basic view of a first embodiment of a system according to the aspects of the disclosed embodiments depicted in the direction of the conveyor.

A more detailed structure of the system is described referring to a first embodiment of a system 100 according to the aspects of the disclosed embodiments shown in FIG. 2*a*. A system 100 according to the aspects of the disclosed embodiments includes, in all of its embodiments, detection means 22 comprising at least one lighting device 30 shown in FIG. 2*b* for illuminating trees on the conveyor 20, at least one camera 36 for recording the conveyor 20, and a computing unit 42 comprising a memory 44 and software means 24 for recognising a harmful object 14 based on machine vision. Henceforth, the word stone 14 is used for the harmful object in the examples. In addition, the system 100 preferably includes data transfer means 48 for sending a conveyor 20 stop command to the conveyor 20 after a recognition of a stone 14. The software means 24 are arranged to create a conveyor 20 stop command based on the detection of a stone 14 and also send the stop command automatically to the conveyor. According to FIG. 2*b*, in the area of the camera 36 and the lighting device 30, the conveyor 20 is closed with ambient light covers 25 for preventing penetration of light from the environment to the conveyor. This is important in order that lighting devices in the operating environment do not directly illuminate wet trees on the conveyor, but illumination only takes place with the lighting device or preferably lighting devices 30 of the system 100 indirectly using the ambient light cover 25 as a reflection surface. FIGS. 2*a*, 2*c*, 2*d* 3*a*, 3*c* and 3*d* are all depicted without lighting devices and ambient light covers, but it is to be understood that these components are always present in a system according to the aspects of the disclosed embodiments.

Advantageously, the inner surface of the ambient light cover, which is used to reflect light indirectly to the conveyor, is matt surfaced in order that light aimed at it is divided to several different parts and does not reflect back directly towards the conveyor. This provides indirect lighting, which prevents generation of reflections and reduces shadows on the conveyor. A matt surface can be provided with a covering of the ambient light cover.

Figure 2C:
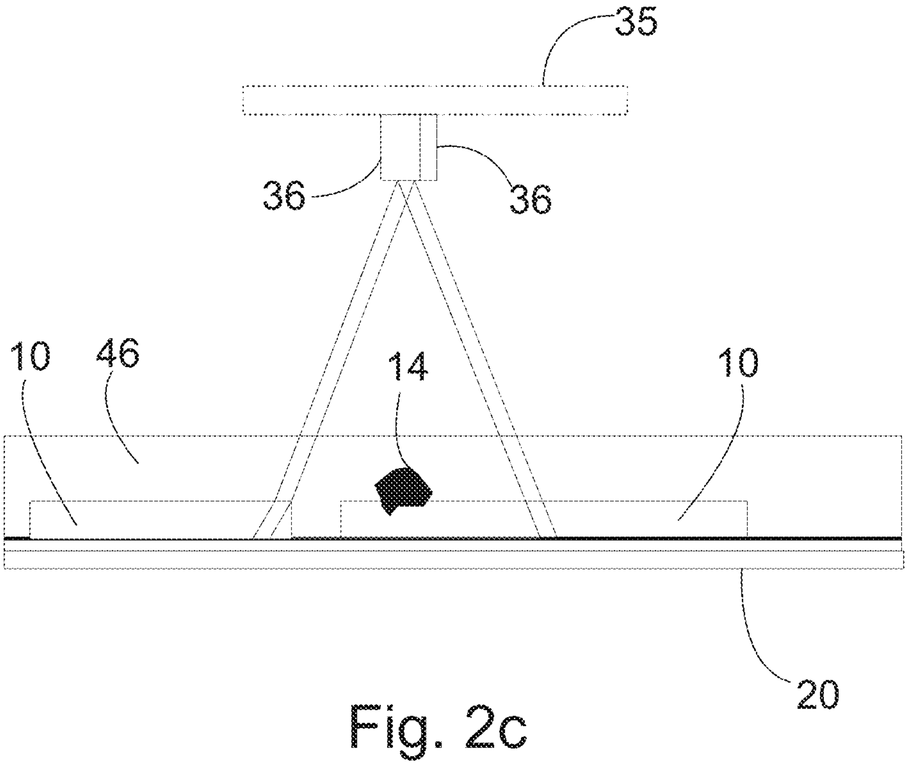
FIG. 2*c* is a basic view of a first embodiment of a system according to the aspects of the disclosed embodiments depicted in the transverse direction relative to the conveyor.
Figure 2D:
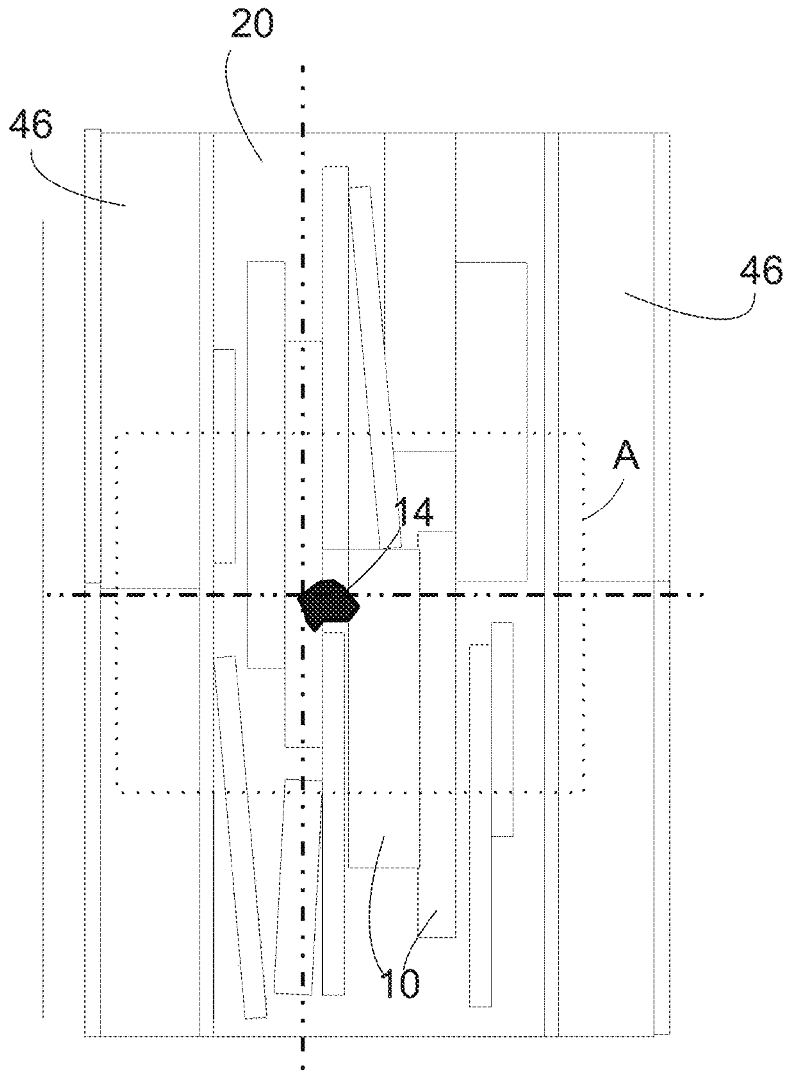
FIG. 2*d* is a basic view of a first embodiment of a system according to the aspects of the disclosed embodiments depicted from above.

For suspending cameras 36, the system 100 may include a separate bar 35 shown in FIG. 2*c* which is supported to the conveyor 20. The bar is located at a suitable distance from the conveyor so that trees on the conveyor do not bump against them. At the same time, the bar must be sufficiently close so that the detection means get reliable detections. A suitable distance can be between 0.5 and 3.0 m, preferably between 1.2 and 1.9 m. The bar can be fastened to the bottom surface of the lid of the ambient light cover, preferably at the center, on top of the conveyor.

Illumination and Recording

First Embodiment

FIGS. 2*a* to 2*d* illustrate a first advantageous embodiment of a system 100 according to the aspects of the disclosed embodiments. In the first embodiment, one preferably more lighting devices 30 located in the context of the conveyor 20 are advantageously used for illumination as a continuous light source. The conveyor 20 is continuously recorded with one or preferably two cameras 36 functioning as detection means 22 for creating images. According to FIGS. 2*a* and 2*b*, the cameras 36 may consist of two separate cameras 36 with one lens or one camera equipped with two lenses. Advantageously, hues and distances are determined as preprocessing from images taken by cameras using software means of either the camera or the computing unit, the software means 24 thus also functioning as distance measurement means 26. By recognising drastic hue changes, a neural network that preferably forms the software means 24 finds suspicions of stones, after which the positions with hue changes are inspected more accurately to find drastic distance differences, for detecting shapes and dimensions corresponding to stones.

Two cameras can also be used in stereoscopic measurement, where the conveyor 20 is recorded with two or more cameras 36 that are synchronized with each other. The cameras 36 record the same point on the conveyor from different angles. When the respective location of the cameras 36 is known, a three-dimensional set of point clouds or a disparity image, i.e., a 3D model of the material present on the conveyor can be created with the software means based on the images. When using a disparity image, the image indicates how much the images of the cameras differ from each other. The more the images differ, the closer the light-reflecting object, for example a stone or tree, at the pixel in question is to the camera. Based on a disparity image, an elevation image can be created, which shows the length, width and also height of the objects visible in the camera image; that is, a type of 3D model is created.

In other words, the two separate 2-*dimensional* images of the stereo camera are merged to form a 3-dimensional image. Merging of the images can take place either directly in the camera or later in the computing unit.

The camera or cameras used are preferably colour cameras, which enables a separation based on hues. A particularly advantageous method of implementation is to use a colour camera, which is also a stereo camera. An example of this is the Rudy 3d depth camera manufactured by German Nerian Vision GmbH.

Detection means 22 preferably operate at a sampling frequency selected based on the conveyor's transfer speed and the desired accuracy. In order to find stones with the system, for example, with a diameter of 5 cm while the conveyor moves at 1.2 m/s, the sampling frequency may be, for example, between 5 and 7 Hz, if two successive images are wanted for each object. For example, the width of the field of view may correspond to the width of the conveyor, 1.5 m, and the length of the area to be recorded can be 2 m in the longitudinal direction of the conveyor. Generally, the sampling frequency may range between 0.6 and 10 Hz depending on the conveyor speed, the distance between the detection means and the conveyor, and the field of view of the detection means. Advantageously, the sampling frequency is arranged according to the transfer speed of the conveyor so that a detection is obtained for each object monitored from 1 to 10, preferably 2 to 5, most preferably from three successive images. This improves the accuracy of the method.

According to FIG. 2*a*, the system 100 may additionally include, according to an embodiment, a separate colour camera 65 for recording trees 10 on the conveyor 20 after the debarking drum. Software means 24 are then arranged to store the colour images of the colour camera and train the neural network by comparing the colour images and the images taken at the same moment by the detection means. However, the use of a separate colour camera is not obligatory, if colour cameras are directly used as detection means.

Second Embodiment—Laser Light

FIGS. 3*a* to 3*d* show a second embodiment of the aspects of the disclosed embodiments, wherein the detection means 22 preferably consist of one camera 36 and the distance measurement means 26 of a laser light 34, the reflection of light sent by which is detected with the detection means 22. The laser light 34 functioning as the distance measurement means creates a laser line 37 on the conveyor 20. The laser line 37 is created in such a way that its direction is transverse relative to the conveyor 20 transporting trees 10 and it preferably extends between the edges 46 of the conveyor 20 over the entire width of the conveyor 20. The laser line 37 projected on the surface of the conveyor 20 and the trees 10 lying on its surface and any stones 14 is measured with detection means 22 based on the light reflected by the line for creating measurement data. The laser light 34 can be supported in the corresponding way as in the first embodiment, on a bar 35 according to FIG. 3*c*.

Using the software means 24 of the computing unit 42, the laser line is sought from the images and its length is measured. The laser line can be measured by recording the image comprising the laser line with a camera; the Y coordinate of the point comprising the laser line in the image represents the distance of this point from the camera, the X coordinate represents the location of this point in the lateral direction, while the third dimension can be defined in a function of the time of recording and the movement of the object. The method is based on laser triangulation wherein the camera and the laser light are oriented to the same object, however, at an angle relative to each other. The laser beam reflected from the object recorded is oriented to different points in the camera cell depending on the distance between the object and the laser light. Based on this difference, it is possible to determine dimensions of the object when the locations of the laser light and the camera as well as the angle between the orientation are known.

The individual lengths of the laser line are stored in the memory 44 and successive lengths of the laser line are compared to each other. Based on the comparison, the software means are arranged, as a machine vision application, to recognise a stone based on successive growing and then shortening laser line lengths. In other words, stone detection is based on laser triangulation in the first embodiment.

Figure 3A:
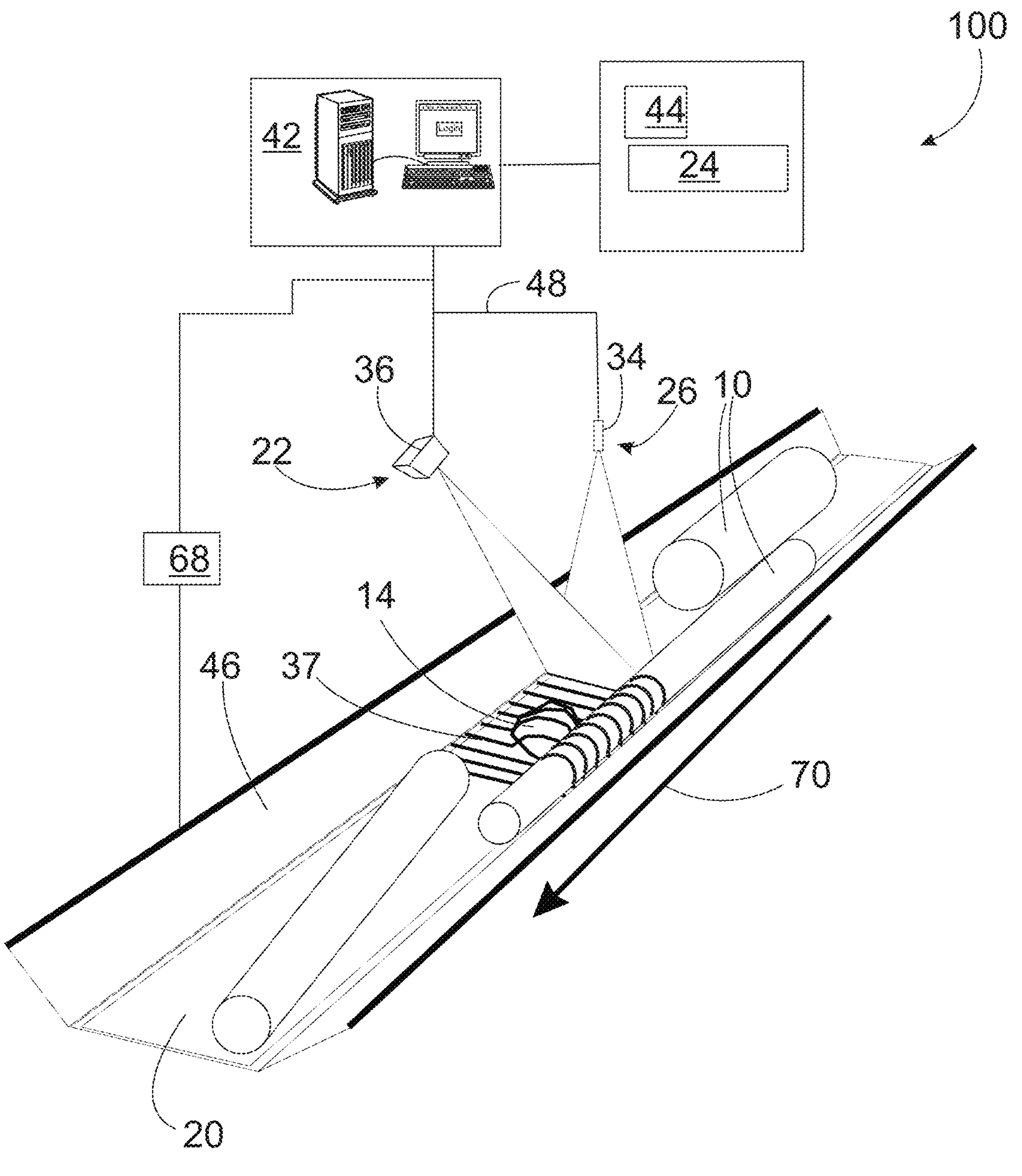
FIG. 3*a* is an axonometric basic view of a second embodiment of a system according to the aspects of the disclosed embodiments.
Figure 3B:
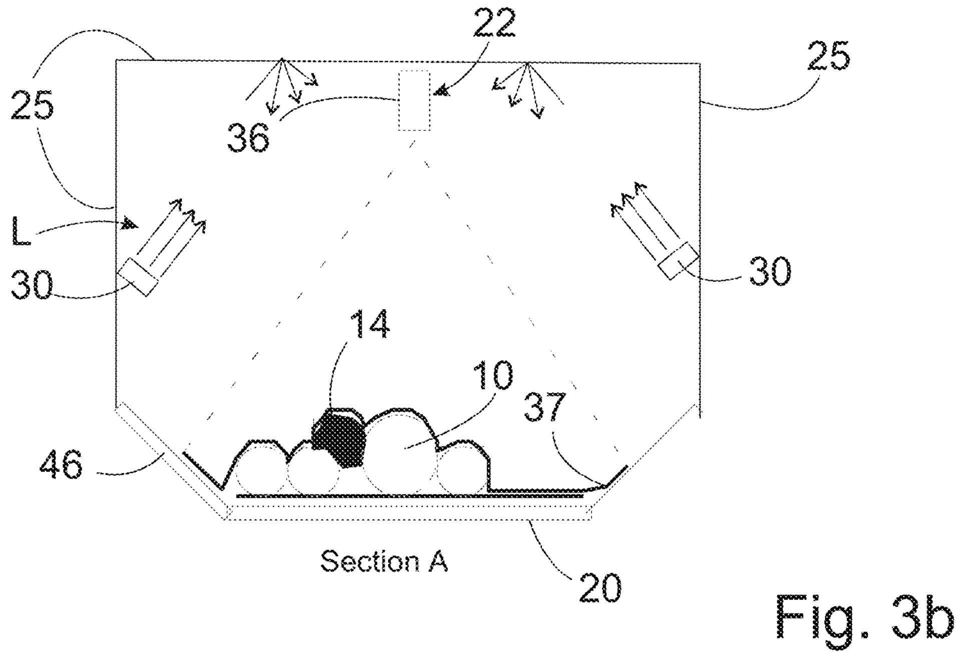
FIG. 3*b* is a basic view of a second embodiment of a system according to the aspects of the disclosed embodiments depicted in the direction of the conveyor.
Figure 3C:
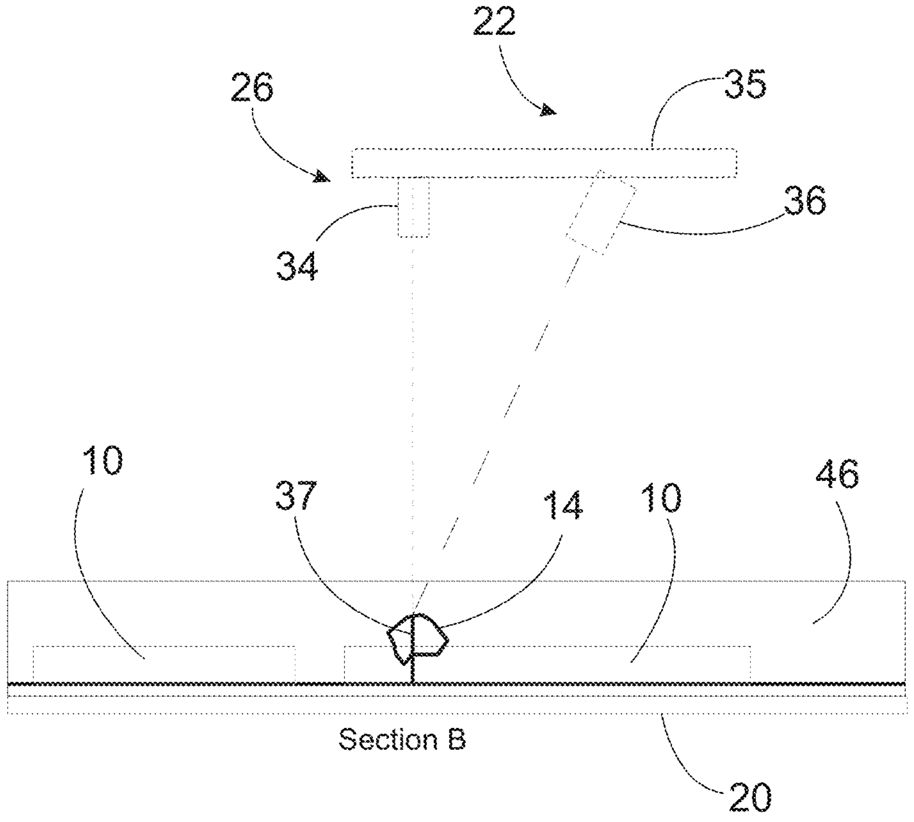
FIG. 3*c* is a basic view of a second embodiment of a system according to the aspects of the disclosed embodiments depicted in the transverse direction relative to the conveyor.
Figure 3D:
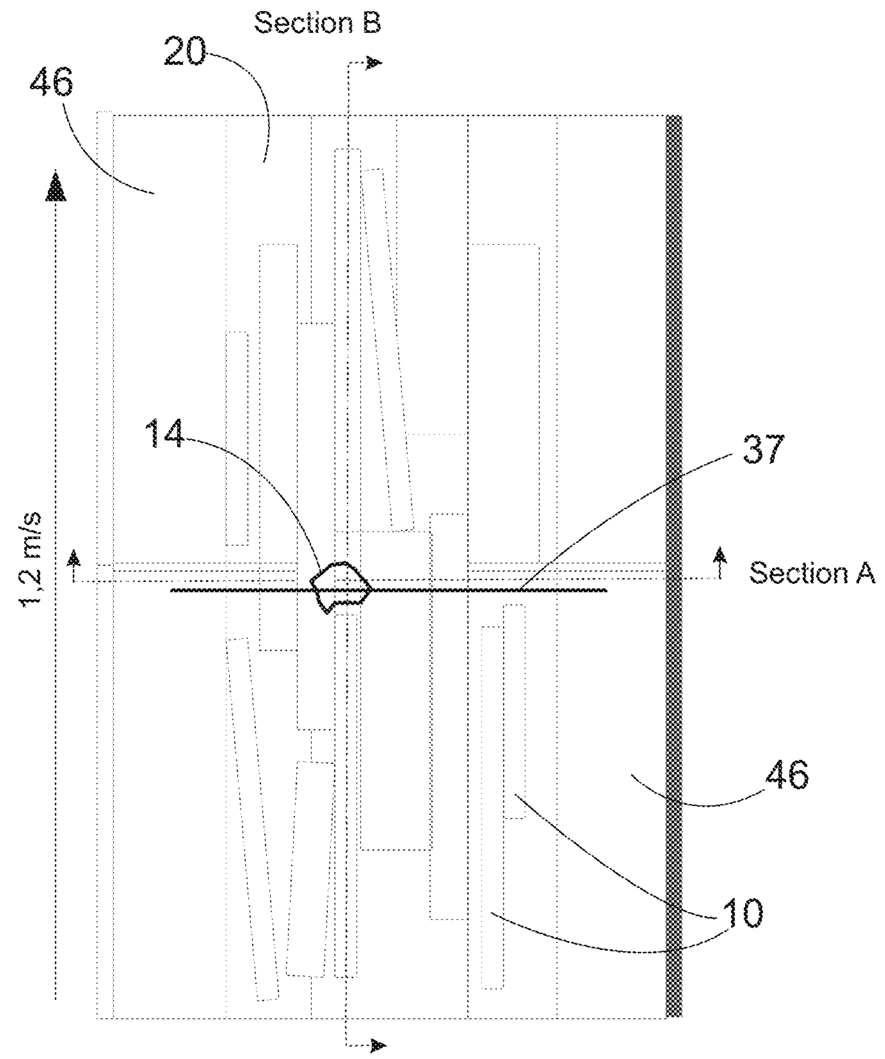
FIG. 3*d* is a basic view of a second embodiment of a system according to the aspects of the disclosed embodiments depicted from above.

In this case, the sampling frequency must be between 100 and 500 Hz, preferably between 200 and 400 Hz, in order that laser lines are detected at an interval of at least 1 cm and a sufficient number of detections of an individual stone is obtained for finding it. In FIG. 3*a*, arrow 70 shows the travel direction of the conveyor 20. The camera 36 records the laser line 37 from an angle relative to the direction of the laser line 37 from the laser light 34, therefore, the height of the trees 10 on the conveyor 20 is shown in the image of the camera 36 as a change of Y coordinates of the laser line 37. The machine vision system uses this to measure the cross-section of the material on the conveyor. When the conveyor moves, the machine vision system of the software means can measure dimensions of the trees on the conveyor. If a change is detected in the dimensions, based on the change, it is possible to determine that a stone is present.

Since the use of a camera for recording trees requires the use of a lighting device for illuminating the trees for recording and, on the other hand, the use of a laser light preferably requires a dark environment, it is possible to interrupt the illumination for the camera by using a strobe light as the lighting device, which illuminates the object momentarily for camera recording and interrupts lighting during the use of a laser light. Advantageously, software means are arranged to control the timing of illumination and recording for coordinating the functions.

Data Transfer From a Camera to Software Means

Measurement data is transferred to the computing unit 42 using data transfer means 48. Data transfer means may consist of wireless data transfer means, such as wlan (wifi), or wired fixed data transfer means, such as a field bus. As the computing unit 42, in turn, a normal PC can be used. In the computing unit 42, measurement data is stored in the memory 44 of the computing unit.

Object Recognition

Object recognition can be based on two alternative methods that use machine vision, namely, at least partly, on the use of a neural network based on statistical analysis or on deterministic pattern recognition. More preferable of these is the use of a neural network, which is lighter for computation in a real-time process.

Advantageously, machine vision implemented with software means searches the measurement data for objects with a shape and hue of a stone and corresponding dimensions both in the case of a neural network and in pattern recognition. In other words, hues are recognised from the images and their location is registered to the field of view in the memory of the software means, hue distances in the field of view are determined and stored as three-dimensional information pertaining to the field of view, patterns and, furthermore, stones based on the patterns, are recognised with the help of registered hues and three-dimensional information pertaining to the field of view. A detection of a deviating shape is interpreted as a stone, based on which a conveyor stop command is preferably created.

Conveyor Stop

Once the software means 24 have recognised a stone 14 among trees 10 according to a selected criterion, the software means 24 preferably generate a conveyor 20 stop command, which can be automatically transferred, using data transfer means 48, to the operation control 68 of the conveyor 20 for stopping the conveyor 20. In addition, an alarm and an image of the stone detection can be presented to the supervisor so that the supervisor can check the image visually by him-/herself. If, in the opinion of the supervisor, the image depicts a stone, he/she can go and remove the stone from the conveyor and the conveyor can be restarted. Alternatively, if the supervisor considers that the system has stopped the line in the image for a detection of a branch, the supervisor can start the conveyor without going to the conveyor. In FIG. 2*a*, arrow 70 shows the travel direction of the conveyor 20.

Steps of the Method

Figure 4A:
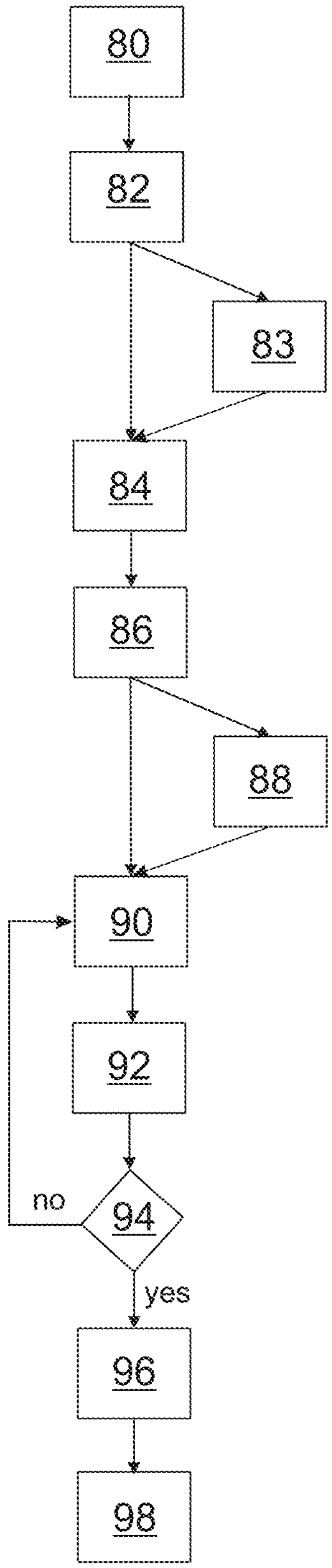
FIG. 4*a* is a block diagram illustrating the steps of a method according to the aspects of the disclosed embodiments.
Figure 6:
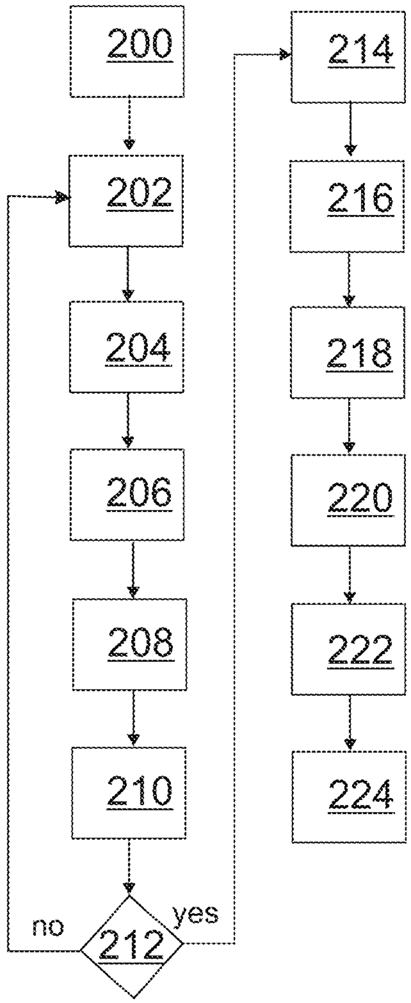
FIG. 6 is a block diagram illustrating additional steps of an embodiment of a method according to the aspects of the disclosed embodiments.

FIG. 4*a* is a block diagram illustrating the steps of the method according to the aspects of the disclosed embodiments. In the method, in step 80, trees are debarked with a debarking drum and, in step 82, objects smaller than a selected dimension are removed from among the trees in the debarking drum through bark openings included in the debarking drum. Steps 80 and 82 take place simultaneously since, when dropping down from the edges of a rotating debarking drum, bark and loose stones detach from the trees and get removed from the debarking drum through the bark openings while collisions of trees against each other and the debarking drum simultaneously detach bark from the surface of the trees. This may be followed by an advantageous alternative step 83, in which bark piles are decomposed for separating stones from accumulated bark. More detailed method steps of this step are shown in FIG. 6. In step 84, debarked trees are routed from the debarking drum over a trap for separating stones bigger than a selected dimension from among the trees. For example, the debarking drum may be inclined towards the travel direction of trees so that trees slide out from the debarking drum by gravity. The debarking drum can be followed by a separate second conveyor, which transports the trees from the debarking drum to the trap. Alternatively, the trap can be located lower than the debarking drum, in which case the transfer can be performed, for example, using an inclined chute or channel, along which trees slide to the trap. The trap is preferably a water-filled stone trap, but it is also possible to use different kinds of traps, such as traps equipped with openings or slots, for collecting stones. From the trap, debarked trees are transferred forward with the conveyor in step 86.

After this, the method includes, in the second and third embodiments, an extraordinary step 88 in which the conveyor is illuminated with visible light or a laser light beam is sent to the conveyor. Delivered light provides a reflection. In step 90, the conveyor is recorded with a camera and, in step 92, a stone is automatically detected with detection means based on images using software means. The stone recognition of step 92 uses recognition of hues and distances. In step 94, a decision is made whether or not a stone can be recognised on the conveyor based on the detections. If a stone is not detected on the conveyor, the detection means continue making detections for finding stones and, if a stone is found, the conveyor is preferably stopped in step 96 based on a stone detection. Finally, in step 98, the stone is removed from the conveyor. Once the stone is removed, the conveyor can be restarted again.

Figure 4B:
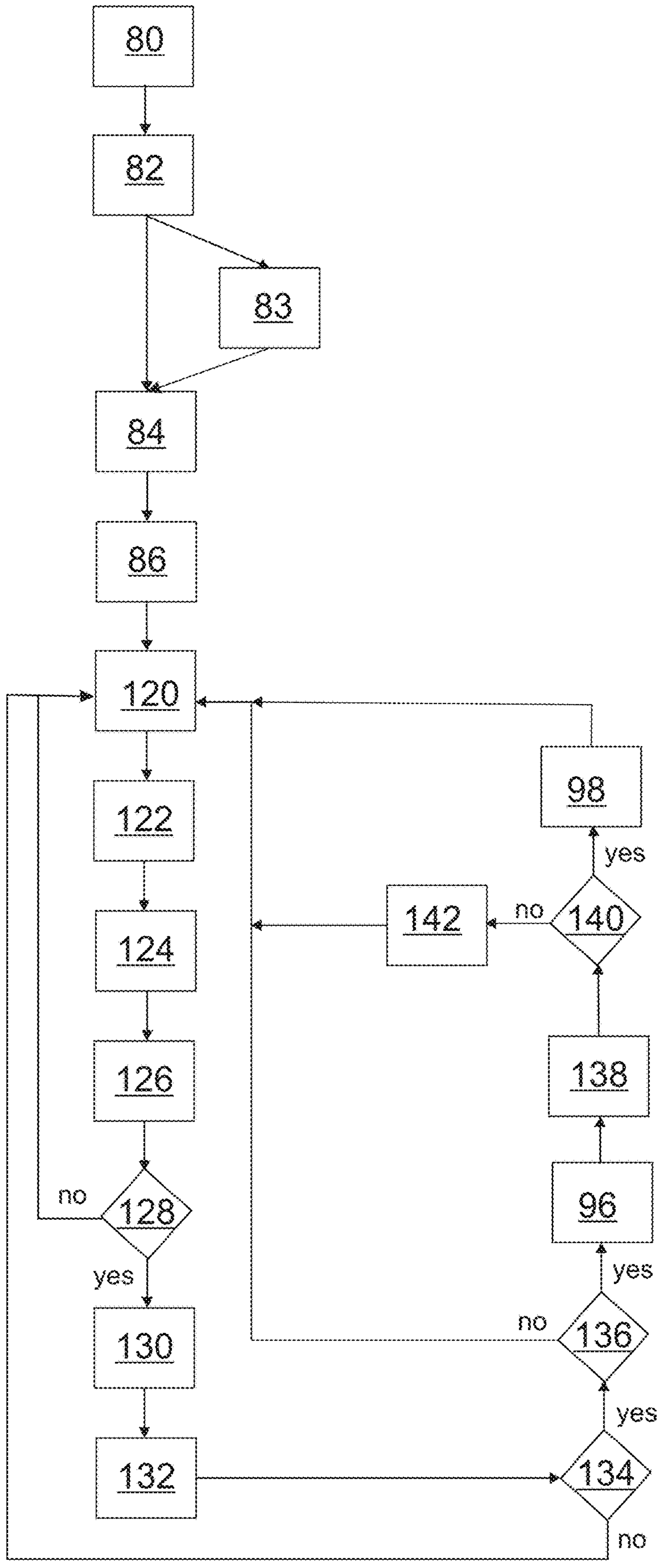
FIG. 4*b* is a block diagram illustrating the steps of an advantageous embodiment of a method according to the aspects of the disclosed embodiments.

FIG. 4*b* is a block diagram showing in more detail the steps of one advantageous method of implementation. Regarding steps 80 to 86, the method is identical relative to the general implementation shown in FIG. 4*a*. In this embodiment, trees travelling on the conveyor located after the debarking drum are recorded with a pair of stereoscopic cameras in a synchronised manner in step 120. The pair of stereoscopic cameras provides two images as output (left and right). The location of the cameras relative to each other is known, as well as the orientation of the cameras. Based on triangulation, the locations of recognised features in a 3-dimensional space are computed from the images in step 122, when considering the external and internal geometry of the cameras and their calibration. The features are recognised based on hues and shapes, when both the hue and the shape indicate a presence of a stone.

In step 124, based on the locations, a three-dimensional image is produced wherein, in addition to the hue, also the distance relative to the camera has been stored for each pixel. In step 126, these individual pixels are stored in a three-dimensional coordinate system as a three-dimensional image. The minimum camera resolution can be 640×480, preferably from 800×600 to 1440×1056, for example. A resolution of 800×600 provides a dot density of 2 mm at the measuring distance. The resolution can be higher if recording is desired on a larger area or from a bigger distance.

Harmful Object Recognition

Deep Learning Neural Network

In step 128, the three-dimensional image is processed with a Deep Learning (DL) neural network which has been told to learn images with stones taken with the same system during the calibration stage. In step 128, the DL neural network searches three-dimensional images for objects the hue and shape of which would correspond to stones trained to it. If one is found, DL computes a percentage of certainty for it in step 130 and the coordinates of the rectangular surrounding the object in step 132. Advantageously, henceforth, the field of view used in the processing is limited to comprise only the area A of the image defined by the rectangular for increasing the efficiency of observation, as shown marked with broken lines in FIG. 2*d*. With a 0 percent certainty, the image does not contain anything similar with stones trained to it, whereas with a 100 percent certainty, an object that perfectly corresponds to stones trained to the neural network is found in the image. In practice, objects exceeding the percentage of certainty, which can be, for example, between 40% and 60%, preferably 50%, are interpreted as stones.

In the step of using the neural network, the input of the neural network is a three-dimensional image which is interpreted with the neural network. More precisely, the input information preferably uses two channels, one channel being said three-dimensional information and the other channel representing the recognised hue information of the image.

Software means monitor the stone detection information provided by the DL neural network and compare it to the limit values in step 134. If the percentage of certainty exceeds a preselected limit, for example 50%, the software means perform checks in step 136 on the elevation data of the object and the area surrounding it aiming to eliminate stops caused by tree ends. With the check, it is examined whether the elevation data of the object continues uniformly in the direction of the longitudinal axis of the object outside the rectangular surrounding the object in one direction and changes rapidly in the other direction. If this is the case, a tree end is probably concerned, not a stone. In addition to said percentage of certainty, stone recognition data includes the coordinates of the rectangular surrounding the detection, the hue information contained in the image and elevation data. If the percentage of certainty is exceeded and the dimensions of the object do not match with a typical tree end, the conveyor is stopped in step 96 and, in step 138, the images are presented on the control room monitor wall so that operators can estimate, in step 140, whether this is clearly an object other than a stone. If this is the case, operators can restart the conveyor immediately in step 142. If, on the other hand, a potential stone is concerned, operators go next to the conveyor in step 98 to observe the object and possibly remove it from among the trees.

When using a neural network, it is to be understood that the neural network must be told to learn a great number, preferably tens or hundreds of images, in which a harmful object appears before the neural network can be utilised in a method according to the aspects of the disclosed embodiments. This training work can be performed using a separate training computer suitable for this purpose. Advantageously, the user has manually defined the harmful object in the images to be trained for the neural network. On the other hand, it is also possible to crop out from the training material things that are not desired to be detected, in other words, that this is not a harmful object for which the conveyor should be stopped. The training computer is preferably more efficient for its computing capacity and particularly graphic computing capacity than a computer used in real-time observation in a system according to the aspects of the disclosed embodiments. This is because the neural network itself requires relatively little computer computing power during the method according to the aspects of the disclosed embodiments.

Pattern Recognition

Pattern recognition can be used instead of or in addition to the harmful object recognition performed with the Deep Learning neural network described above. Pattern recognition utilises the same 3d images for harmful object recognition as the neural network, but with a different principle of operation. Pattern recognition is a deterministic method with accurate initial parameters for harmful object recognition; these parameters are examined utilising certain formulas and conditions while examining 3d images. These conditions and formulas can be successive related to, for example, hue gradients and distances of images. For this reason, calibration of pattern recognition for an application may be more laborious than in the case of a neural network, which is only told to learn a great number of images in which a stone has been detected.

Decomposition System for Bark Piles

According to an advantageous embodiment, the system additionally includes a decomposition system 75 for bark piles shown in FIG. 1. In summer, particularly during the bast period, spruce bark detaches in debarking drums as long continuous bark strands which cannot drop out of the debarking drum 12 through bark openings 16. Bark strands become entangled as the debarking drum 12 rotates forming bark piles among or inside of which stones, metal objects or pieces of plastic or other objects may remain. At the same time, stones can move over traps on top of bark piles. For example, stones are very difficult to detect with machine vision among bark piles and can thus pass by the camera without it causing an alarm for stopping the debarking line.

Figure 5:
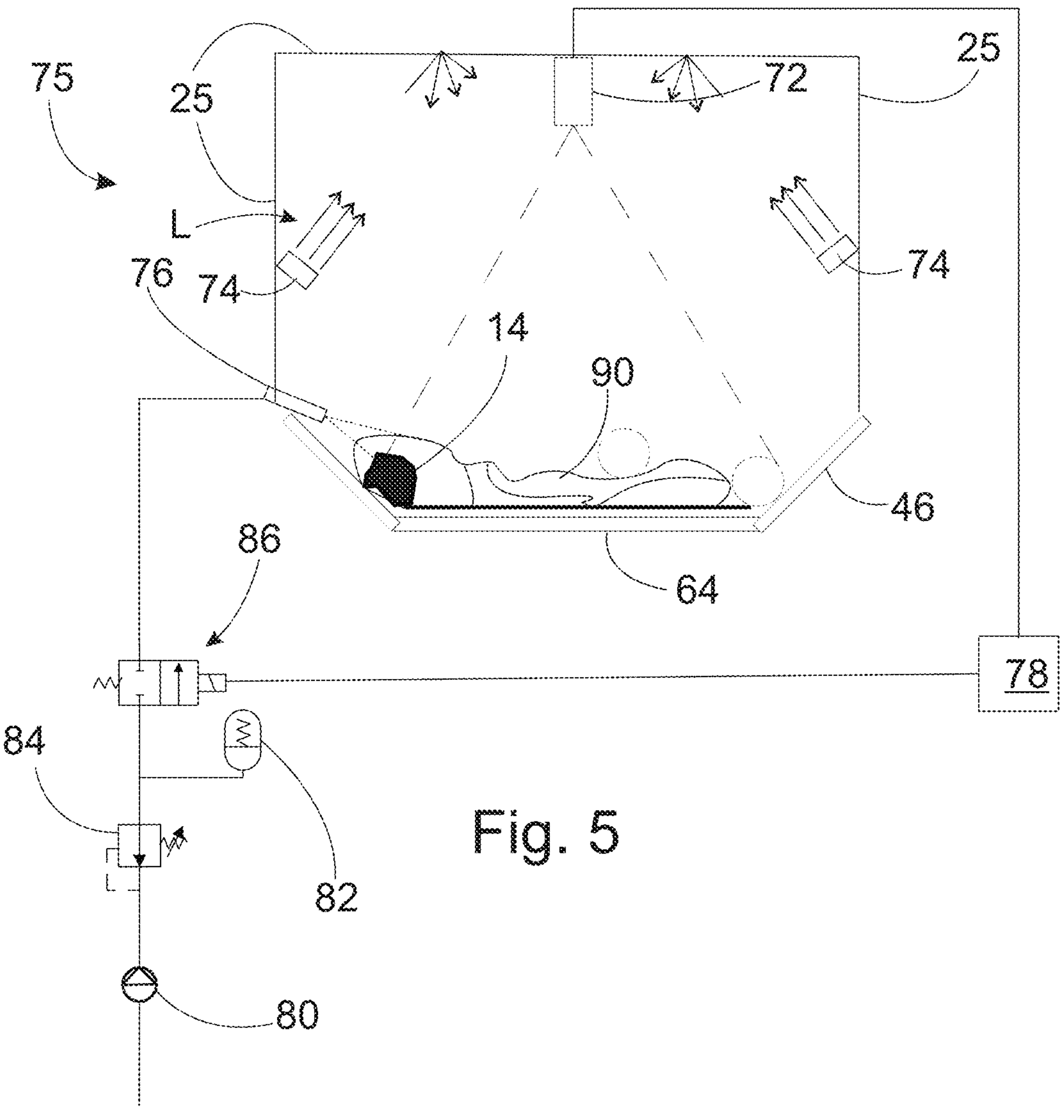
FIG. 5 is a basic view of a decomposition system for bark piles of an advantageous embodiment of a system according to the aspects of the disclosed embodiments.

More precisely, the decomposition system 75 for bark piles includes a water jet 76, shown in FIG. 5, which is aimed to the intermediate conveyor 64 for spraying water towards the intermediate conveyor 64. The water jet can be a water jet using high-pressure water at 80 to 300 bar, preferably 150 to 250 bar. Advantageously, the decomposition system 75 for bark piles additionally includes a high-pressure pump 80, which preferably pressurises, with the help of a coarse filter, purified water which is generally used on a debarking line for washing trees with cleaning nozzles. The high-pressure pump 80 delivers water to a pressure accumulator 82 via a pressure relief valve 84 when the shut-off valve 86 in the line leading to the water nozzle 76 is closed. When water in the pressure accumulator 82 reaches the pressure of 80 to 300 bar, the high-pressure pump 80 is stopped and the shut-off valve 86 is controlled based on second software 78.

The decomposition system 75 may also include, according to FIG. 5, an additional camera 72 and an additional lighting device 74, which are located in the initial part of the intermediate conveyor 64 of the debarking drum 12. With the additional camera 72 and the additional lighting device 74, it is possible to recognise bark piles using machine vision. The additional camera 72 records the intermediate conveyor 64 illuminated by the additional lighting device 74 and sends the images to the second software 78 that runs machine vision. When the second software 78 detects a bark pile on the intermediate conveyor, the arrival time of the bark pile at the water nozzle 76 is computed and the water nozzle 76 is controlled to provide a momentary water jet for decomposing the bark pile. The second software 78 delivers a command to an electrical actuator (not shown) of the shut-off valve 86 to open the shut-off valve 86, whereupon high-pressure water contained in the pressure accumulator is discharged through the water nozzle 76 as a water jet to the intermediate conveyor 64 at the bark pile decomposing the bark pile and exposing a stone present therein. Once the bark pile is decomposed, a loose stone either ends up in the trap or is detected by the camera before the chipper 52 for stopping the wood processing line 50.

The water nozzle or nozzles are preferably located on the sides of the intermediate conveyor 64 and oriented slightly upwards from the level of the intermediate conveyor.

FIG. 6 is a block diagram showing steps of the bark pile recognition and decomposition. In the first step 200, the intermediate conveyor is illuminated with one or more additional lighting devices and, in step 202, the intermediate conveyor is recorded by one or more additional cameras. In step 204, images are sent to the second software, which compares the images to images present in the database and criteria for recognising a bark pile in step 206. In step 208, a probability of the presence of a bark pile in a selected image is created and, in step 210, the probability is compared to the alarm limit value. If the probability in step 212 exceeds the alarm limit value, a control command is sent by the second software to the actuator of the shut-off valve to open the shut-off valve. Before or during the recording, water has been pumped in step 214 with the high-pressure pump to the pressure accumulator via the pressure relief valve. In step 216, the high-pressure pump has been stopped after reaching the target pressure of the pressure accumulator while the shut-off valve is closed. In step 218, the actuator opens the shut-off valve and, in step 220, high-pressure water is discharged from the pressure accumulator via the water nozzle as a water jet towards the bark pile on the intermediate conveyor for decomposing it. Finally, in step 222, the second software sends a command to the actuator of the shut-off valve to close the shut-off valve and the shut-off valve is closed in step 224.

In this context, it is to be understood that steps depicted in FIG. 6 preferably take place during an optional step 83 of the block diagram of FIGS. 4*a* and 4*b*. Although the use of a water jet is shown in FIG. 6 for separating stones from bark piles, it can be contemplated that the same technique can also be used during winter to detach stones that have frozen to trees.

System

Figure 7:
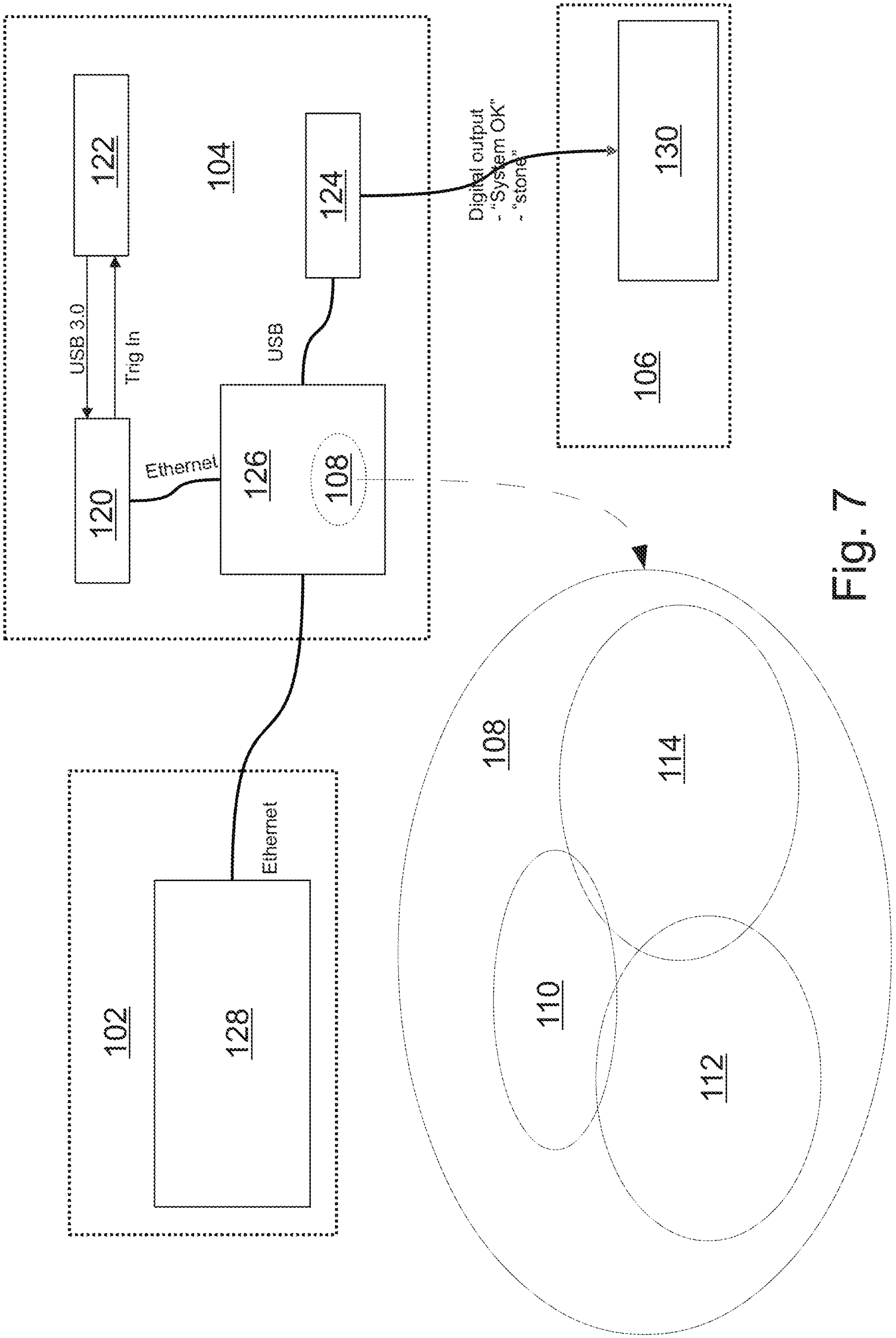
FIG. 7 illustrates an advantageous embodiment of a system according to the aspects of the disclosed embodiments.

FIG. 7 illustrates an advantageous embodiment of the system 100 according to the aspects of the disclosed embodiments. The basic components of the system can be divided into a component 102 located in the control room of the wood processing line, a component 104 located on the production line and a component 106 located in the automation room. The component 102 located in the control room of the system 100 preferably houses a PC 128 equipped with a remote user interface with the software means comprised in the machine vision unit, a computer user interface comprising a display, mouse and keyboard, and an image display for the operator of the wood processing line. In turn, the component 104 located in the production line houses a mini PC, which is connected to a camera and preferably also to an additional camera and un USB relay controller by means of a local area network. Reference number 120 represents preprocessing, box 122 indicates recording, 124 refers to the USB relay controller and 126 to the mini PC, which has machine vision and I/O control in the context thereof. Preprocessing means in this case creating of images recorded by a camera or cameras during recording 122 in such a way that one image is a two-dimensional image recorded with the camera and the other one is a separate image created with software comprising the three-dimensional information. The mini PC comprises software means 108, which process the information arriving from the camera via preprocessing. In turn, the component 106 located in the automation room houses, in section 130, the control of the wood processing line and its actuators with the help of which the wood processing line can also be stopped.

The content of the software means is described in section 108 and it comprises a machine vision unit 110, a machine learning artificial intelligence unit 112 and a control unit 114. The machine vision unit 110 is arranged for creating and presorting of images and the machine learning deep learning artificial intelligence unit 112 is arranged for stone recognition based on the material trained and for storing images and outputs, and the control unit 114 for controlling user interface connections and creating an output analysis and stopping decision.

As was described earlier in the context of FIG. 5, machine vision of the software means examines this model to determine whether it contains objects that resemble stones for their shape. If these are found, the machine vision unit delivers a 3D image and a conventional image from the second camera to the artificial intelligence unit, which is preferably a Deep Learning neural network. The artificial intelligence unit has been told to learn images with stones and images without stones. Based on these, artificial intelligence makes the decision whether or not a stone is present in the image. If a stone is found in the image, it is assigned a probability value between 0 and 100 and the outputs are delivered to the control unit (I/O control). In other words, the output of the neural network is the probability value and the location of a detected harmful object in the image. If the control unit receives results from the artificial unit that correspond to the desired criteria (stone probability, location, size, etc.), the control unit delivers information about the stone with the system relay card to the stopping automation system of the wood processing line and delivers the images marked by the artificial intelligence unit to the machine vision unit to be presented to operators of the wood processing line.

In a system and a method according to the aspects of the disclosed embodiments, for machine vision based pattern recognition, it is possible to use, for example, software known by the product name VisionPro of Cognex Corporation (USA), to perform image processing and recognition. The software can be used with a conventional PC. In turn, the Deep Learning neural network can be, for example, Halcon MVtec software. The laser light used in the implementation according to the first embodiment can be, for example, a line laser marketed with the product name Stingray of Coherent Inc. (USA), model STR-660-100-CW-FL-L01-60-S-XX-8, in which the line laser power is 100 mW, the sending laser line uses the wavelength of 660 nm, the line laser produces an individual line with an angle of 60°, and with a prefocusing distance of 500 mm. As the camera used as detection means, it is possible to use a camera marketed with the product name JAI SP-5000-GE2 of Stemmer Imaging AG, which records 44 images per second on a 5 MP CMOS cell. As optics in the context of the camera, it is possible to use, for example, a lens from the CBC Group Computar M0824-MPW2-R-series. If the camera used is a colour camera, for example, a colour stereo camera Nerian Ruby 3d depth can be used. As lighting devices producing visible light, it is possible to use, for example, modular LED lights from the LHF300 series of Smart Vision Lights. As the colour camera preferably used as an addition to the detection means, for example, the U3-36L0XC camera manufactured by IDS Imaging Development Systems GmbH can function in this context.

According to an embodiment not included in the aspects of the disclosed embodiments, illumination can also be direct, but in this case the surface area of light must be at least equal to the surface area recorded and with a uniform intensity to avoid reflections.

According to an embodiment not included in the aspects of the disclosed embodiments, a method according to the aspects of the disclosed embodiments can be utilised for recognising any objects from a material flow also in other applications apart from the debarking process and in the context of a debarking drum.

The invention claimed is:

1. A method for processing of trees using machine vision with a software, the method having steps of:

debarking trees with a debarker having a debarking drum, while objects existing in the debarking drum smaller than a selected dimension are removed from among trees through bark openings included in the debarking drum, routing trees from the debarking drum over a trap for removing objects that are bigger than a selected dimension from among trees to the trap, illuminating trees on a conveyor after the debarking with a lighting device by reflecting indirect lighting via ambient light covers on a section of the conveyor covered with the ambient light covers, recording trees on the conveyor after the debarking drum using at least one camera as a detector for creating images, detecting automatically a stone or plastic as a object on the conveyor among trees from the images utilising machine vision in the following steps of:

recognising hue information or gradients as elements from the image, registering the elements to a field of view as registered elements, determining element distances in the field of view thus creating three-dimensional information pertaining to the field of view, recognising patterns with the help of the registered elements and three-dimensional information, and recognising harmful objects with a criterion preselected with the help of the patterns;

moving the trees forward using the conveyor (20), the method stopping the conveyor automatically when the harmful object is detected on the conveyor, and removing the harmful object on the conveyor from among trees.

2. The method according to claim 1, wherein the preselected criterion is one or more of the following: hue, intensity of colours, pattern shape, pattern size, pattern distance.

3. The method according to claim 1, wherein two cameras equipped with one lens or one stereoscopic camera equipped with two lenses are used as the detector, in which case a distance detector is a software component, which is arranged to determine both hues and distances from the images.

4. The method according to claim 1, wherein a colour camera is used as the camera.

5. The method according to claim 1, wherein a pattern neural network is used for recognising harmful objects wherein input information uses two channels, one of the channels for the three-dimensional information and the other channel for recognised hue information pertaining to the image.

6. The method according to claim 5, wherein the following steps are performed before the recording of trees:

harmful objects are manually recognised from training images, edges of the harmful object are marked in training images, and the neural network is told to learn training images based on which the neural network recognises objects.

7. The method according to claim 1, wherein the method uses a separate decomposition system for bark piles formed from bark detached from trees and the bark piles are decomposed with a pressurised water jet system by spraying water at a pressure of 80 to 300 bar to the bark piles for decomposing them for exposing harmful objects potentially existing in the bark piles.

8. The method according to claim 7, the bark piles travelling on an intermediate conveyor are recorded with an additional camera in connection with the intermediate conveyor immediately following the debarking drum before the trap, bark piles are recognised using machine vision of second software from images taken by the additional camera, and water is only sprayed if a the bark pile is recognized.

9. A system for detecting harmful objects from among trees, the system including an ambient light cover for covering a conveyor at least partially, at least one lighting device arranged to illuminate trees on the conveyor indirectly via the ambient light cover, detector comprising at least one camera for recording trees and creating images, arranged in connection with the conveyor, wherein the detector is located after a debarking drum and a trap included in the connection with the debarking drum, a computing unit comprising a memory and a software for automatically recognising harmful objects from the images based on machine vision wherein the harmful object is a stone or plastic, and the software is arranged to recognise hues or gradients as elements from the image, register elements to a field of view, determine element distances in the field of view thus creating three-dimensional information pertaining to the field of view, recognise patterns with the help of the registered elements and three-dimensional information, and recognise harmful objects with a criterion preselected with the help of the patterns, create a conveyor stop command automatically when the harmful object is detected on the conveyor, data transfer unit for sending the conveyor stop command to the conveyor after a recognition of the harmful object.

10. The system according to claim 9, wherein a surface of the ambient light cover facing the conveyor is matt surfaced for dispersing the light emitted by the lighting device for preventing reflections.

11. The system according to claim 9, wherein the detector consist of two cameras equipped with one lens or one camera equipped with two lenses for detecting the harmful object, and the software is arranged to recognise hues from the images and function as a distance detector for determining distances from the images.

12. The system according to claim 9, the system including a separate decomposition system for bark piles, which comprises a pressurised water jet system for spraying water at a pressure of 80 to 300 bar to an intermediate conveyor for decomposing bark piles to expose harmful objects potentially existing in the bark piles.

13. The system according to claim 12, the decomposition system additionally including an additional camera arranged in the connection with the intermediate conveyor immediately following the debarking drum before the trap for recording bark piles travelling on the intermediate conveyor, a second software for recognising bark piles with machine vision from the images taken by the additional camera for controlling the water jet system, based on the images taken by the additional camera, to operate only when the bark pile is detected on the conveyor.

14. The system according to claim 12, wherein the water jet system includes a high-pressure pump for pressurising water to a pressure of 80 to 300 bar, a pressure accumulator for storing pressurised water, a valve for closing pressurised water in the pressure accumulator, and a water nozzle arranged in connection with the intermediate conveyor for spraying water from the water nozzle to the intermediate conveyor for decomposing bark piles, while the second software controls the valve based on images taken by the additional camera for releasing water from the pressure accumulator to the water nozzle.

15. A wood processing line, which includes a debarking drum for debarking trees, the debarking drum including bark openings with a selected dimension for removing objects smaller than a selected dimension from among trees, a water-filled trap located after the debarking drum in a travel direction of trees for removing loose harmful objects bigger than a selected dimension existing among debarked trees from among trees, a conveyor for advancing debarked trees further, and a system according to claim 9 for recognising harmful objects among trees existing on the conveyor.

* * * * *